United States Patent [19]

Yoshimura et al.

[11] 4,100,265

[45] Jul. 11, 1978

[54] PROCESS FOR PREPARATION OF HIGH QUALITY COKE

[75] Inventors: Kiyoharu Yoshimura; Masao Hayashi, both of Izumi, Japan

[73] Assignee: Koa Oil Co., Ltd., Tokyo, Japan

[21] Appl. No.: 710,645

[22] Filed: Aug. 2, 1976

[51] Int. Cl.² .................... C01B 31/04; C01B 57/00
[52] U.S. Cl. ............................ 423/449; 201/44; 201/17; 423/448; 423/460
[58] Field of Search ............... 423/449, 450, 460, 461, 423/448; 201/17, 44

[56] References Cited

U.S. PATENT DOCUMENTS

| | | | |
|---|---|---|---|
| 2,910,411 | 10/1959 | Ottoh | 423/450 |
| 3,112,181 | 11/1963 | Petersen et al. | 423/449 |
| 3,369,871 | 2/1968 | Hardy et al. | 423/449 |
| 3,595,963 | 7/1971 | Franz et al. | 201/25 |
| 3,712,855 | 1/1973 | Allied | 423/461 |
| 3,823,073 | 7/1974 | Minkkinen | 201/44 |

*Primary Examiner*—Earl C. Thomas
*Assistant Examiner*—Gregory A. Heller

[57] ABSTRACT

High quality coke is prepared by calcining green coke obtained by the delayed coking process at a temperature lower than the customarily adopted calcination temperature, once cooling the coke and then calcining the coke at a temperature within the customarily adopted calcination temperature range.

6 Claims, No Drawings

PROCESS FOR PREPARATION OF HIGH QUALITY COKE

BACKGROUND OF THE INVENTION

1. Field of the Invention

The present invention relates to a process for the preparation of high quality coke. More particularly, the present invention relates to a process for preparing coke having improved physical properties, particularly improved apparent density and thermal expansion characteristics for production of graphite electrodes, by calcining green coke obtained by the delayed coking process under novel calcination conditions.

2. Description of the Prior Art

The so-called coking process for cracking heavy oil to obtain light products, i.e., gas, cracked naphtha and cracked gas oil, and heavy products, i.e., coke formed by the condensation reaction, is known is the art. As one modification of this coking process, there is known a so-called delayed coking process in which feed oil is heated in a heating furnace and coke is formed in a coking drum.

It is also known that green coke prepared by the delayed coking process can serve as a carbonaceous material for production of graphite electrodes through a calcination step.

This calcination is performed for removing volatile matters (as measured according to ASTM D-271) from green coke so as to obtain coke suitable for production of electrodes. Ordinarily, this calcination comprises a heat treatment at a temperature about 1200° to 1500° C. using a rotary kiln, a retort, a shaft kiln or the like.

Since the conditions under which electrodes are applied have recently become more severe, coke for production of artificial graphite electrodes is required to have special properties, especially a low coefficient of thermal expansion and a high apparent density.

For example, calcined coke prepared by using green coke obtained by the conventional delayed coking process an calcining it at the above-mentioned conventional calcination temperature has, in general, an apparent density of about 1.30 g/cm$^3$ or lower (as measured by the water coating method described hereinafter) and thermal expansion characteristics such that the coefficient of thermal expansion of an article (shaped from the calcined coke) baked at 1000° C. is about $1.9 \times 10^{-6}$/° C. or higher and the coefficient of thermal expansion of an article (shaped from the calcined coke) graphitized at 2600° C. is about $1.2 \times 10^{-6}$/° C. or higher (each coefficient of thermal expansion being a coefficient of linear thermal expansion as measured by the measurement method described hereinafter). These calcined coke products are used for production of graphite electrodes of the common grade. However, for the production of electrodes to be used under severe conditions, for example, high power electrodes, the starting coke is required to have an apparent density of about 1.35 g/cm$^3$ or higher as measured by the above-mentioned method and thermal expansion characteristics such that the linear thermal expansion coefficient of an article baked at 1000° C. is about $1.5 \times 10^{-6}$/° C. or lower as measured by the above method and that of an article graphitized at 2600° C. is about $1.0 \times 10^{-6}$/° C. or lower as measured by the above method.

As regards the measurement of the coefficient of thermal expansion (C.T.E.), no standards are fixed in the art on the preparation of test pieces, the graphitizing treatment temperature and the measurement methods, and the thermal expansion characteristics are evaluated by the values determined by various different methods. The specific values of the thermal expansion coefficient mentioned above are those determined by the test method voluntarily adopted by us, which will be detailed hereinafter.

Various methods have heretofore been proposed for obtaining high quality coke meeting the above requirements. Most of these proposals are mainly directed to improvements in the process for preparing green coke. For example, there are known a process in which a cracked residuum or cracked tar free of components capable of readily forming an insoluble phase, which is obtained by catalytic cracking or thermal cracking, is used as the raw material and it is formed into green coke according to the known delayed coking process, and a process in which a mixture of a cracked residuum or cracked tar as mentioned above with 10 to 30% of a straight run residuum is used as the feed oil and it is formed into green coke according to the known delayed coking process (see U.S. Pat. No. 2,775,549 and U.S. Pat. No. 2,922,755). There is also known a process in which green coke obtained by subjecting a starting mixed oil comprising 85 to 30% of a straight run residuum and 15 to 70% of a catalytically cracked residuum to delayed coking while recycling all liquid products formed by the coking reaction and having a boiling point higher than 210° C. as measured under atmospheric pressure as the recycle oil is calcined at the above-mentioned calcination temperature (see Japanese Patent Application No. 144687/73).

Improved cokes having a higher quality than coke obtained by calcining green coke from a straight run residuum are obtained according to these known methods. However, each of these previous proposals puts stress on improvements in the starting oil or the delayed coking process, namely the steps for obtaining green coke. In other words, conventional improvements of properties of calcined coke are attained by changing conditions for preparing green coke rather than calcination conditions.

This invention provides a novel process for obtaining high quality coke by improving the calcination step in contrast with the conventional processes.

SUMMARY OF THE INVENTION

We have now found that when green coke obtained by the ordinary delayed coking process is subjected to the first stage calcination at a temperature lower than the above-mentioned customary calcination temperature, once cooled to a sufficiently low temperature and then subjected to the second stage calcination at the customary calcination temperature, coke having a highly improved quality can be obtained. The coke prepared according to the present invention has a higher apparent density and a lower coefficient of thermal expansion than coke obtained by calcining green coke obtained from the customary delayed coking process according to the above-mentioned customary calcination technique.

DETAILED DESCRIPTION OF THE INVENTION

In accordance with the present invention, there is provided a process for the preparation of high quality coke comprising calcining green coke obtained from the delayed coking process at a temperature lower than the customarily adopted calcination temperature, once cooling the coke to a temperature sufficiently lower than the calcination temperature and again calcining the coke at a temperature within the customarily adopted calcination temperature range. More specifically, in accordance with one preferred aspect of the present invention, there is provided a process for the preparation of high grade coke comprising calcining coke obtained from the delayed coking process at a temperature lower than the customarily adopted calcination temperature, for example, about 600° to about 900° C., preferably about 600° to about 800° C., especially preferably about 800° C., once cooling the coke to a temperature sufficiently lower than said calcination temperature, for example, about 100° C. or lower, and subjecting the coke to the second stage calcination at a temperature of about 1200° to about 1500° C.

We were interested in changes in the structure of coke observed when green coke is calcined, and examined effects of the calcination temperature, the calcination time, the calcination frequency and other calcination conditions on the structure and quality of the calcined products. Based on results of these examinations, we have now completed the present invention. Namely, the present invention has been completed based on the results of the following experiments.

(A) Preparation of Coke by One-Staged Calcination

Coke obtained by the ordinary delayed coking process (Experiments Nos. 1 and 2) and high quality coke prepared according to the process disclosed in the above-mentioned Japanese Patent Application No. 144687/73 (Experiment No. 3) were subjected to one-staged calcination at various temperatures indicated below, and changes in the thermal expansion coefficient and apparent density in calcined coke products were examined. Similarly, coke prepared from a starting mixed oil comprising 50% of a catalytically cracked residuum and 50% of a vacuum residuum according to the ordinary delayed coking process, i.e, a high quality coke prepared in a method which is similar to U.S. Pat. No. 2,775,549 (Experiment No. 4) was subjected to one-staged calcination at a conventional calcination temperature, and the thermal expansion coefficient and apparent density were examined.

Experiment No. 1 (Runs A, B, C and D)

Green coke obtained by using as the feed oil a vacuum residuum prepared from Sumatran crude oil and employing a delayed coker of the ordinary type and having a volatile matter content of 8.2% by weight, was pulverized to obtain starting green coke having a size of 3 to 3.5% mesh. Then, 500 g each of the so prepared sample was charged in 4 graphite crucibles, and they were placed in a muffle electric furnace. The temperature was elevated at a rate of 200° C. per hour to a prescribed level, namely, 800° C. (Run A), 1200° C. (Run B), 1300° C. (Run C) or 1400° . (Run D). This elevated temperature was maintained for 1 hour, and the temperature was then lowered to room temperature to obtain the respective calcined coke products. During the calcination step, nitrogen gas was passed through each crucible in order to prevent oxidation of the coke. In each product, the true specific gravity, the yield, the apparent density and the thermal expansion coefficient were determined to obtain the results shown in Table 1.

The thermal expansion coefficient was determined with respect to not only the shaped article baked at 1000° C. but also the shaped article graphitized at 2600° C., in order to examine whether or not the effect of calcination remains after graphitization.

Table 1

Relation between Calcination Temperature and Quality of Calcined Coke (Experiment No. 1)

| | Run A | Run B | Run C | Run D |
|---|---|---|---|---|
| Calcination Temperature, ° C. | 800 | 1200 | 1300 | 1400 |
| Yield of Calcined Coke, % by weight | 92.2 | 90.5 | 90.2 | 89.8 |
| True Specific Gravity, g/cm$^3$ | 1.752 | 2.079 | 2.106 | 2.127 |
| Apparent Density g/cm$^3$ | 1.23 | 1.30 | 1.30 | 1.29 |
| Thermal Expansion Coefficient of Shaped Article 10$^{16}$/° C. | | | | |
| Baked at 1000° C. | 1.5 | 1.9 | 1.9 | 1.9 |
| Graphitized at 2600° C. | 0.8 | 1.2 | 1.2 | 1.2 |

1. The apparent density was measured according to the water coating method using calcined product having a size of about 3.5 to about 4.0 mesh and expressed in the unit of g/cm$^3$. That is, the apparent density was calculated from the dry weight of said coke particles and the volume of said coke particles after water coating.

2. The thermal expansion coefficient (linear thermal expansion coefficient) was determined in the following manner:

The calcined coke was pulverized and a mixture of 92% of particles having a size not smaller than 200 mesh and 8% of particles having a size smaller than 200 mesh was prepared. Then, 25 parts of coal tar binder was incorporated in 100 parts of the particulate mixture, and the resulting mixture was heated and kneaded. Then, the kneaded mixture was molded in rectangular parallelepipeds having a width of about 15 mm, a height of about 15 mm and a length of about 80 mm and baked at 1000° C. or graphitized at 2600° C. The linear thermal expansion coefficient in each of the so obtained test pieces was determined by measuring the linear thermal expansion perpendicular to the molding direction at 30° C. to 100° C. by means of a dilatometer of the liner variable differential transformer type.

Experiment No. 2 (Run E)

Green coke obtained by using as the feed oil a vacuum residuum prepared from Sumatruan crude oil and employing a delayed coker of the ordinary type and having a volatile matter content of 8.9% by weight was calcined in the same manner as in Run C of Experiment No. 1. Properties of the calcined coke product are shown in Table 2.

Table 2

Relation between Calcination Temperature and of Calcined Coke (Experiment No. 2)

| | Run E |
|---|---|
| Calcination Temperature, ° C. | 1300 |
| Yield of Calcine Coke, % by weight | 91.3 |
| True Specific Gravity, g/cm$^3$ | 2.105 |
| Apparent Density, g/cm$^3$ | 1.30 |
| Thermal Expansion Coefficient of Shaped Article 10$^{-6}$/° C. | |
| Baked at 1000° C. | 1.7 |
| Graphitized at 2600° C. | 1.2 |

Experiment No. 3 (Runs F, G and H)

A mixture comprising 80% of a vacuum residuum prepared from Sumatran crude oil and 20% of catalytically cracked residuum was subjected to delayed coking while recycling all heavy liquids formed during the coking reaction and having a boiling point higher than 210° C. as measured under atmospheric pressure. Then, the so obtained high quality green coke having a volatile matter content of 7.9% was charged in three graphite crucibles and calcined at 800° C. (Run F), 1300° C. (Run G) or 1400° C. (Run H) in the same manner as in Experiment No. 1, to obtain the results shown in Table 3.

Table 3

| Relation between Calcination Temperature Quality of Calcined Coke | | | |
|---|---|---|---|
| | Run F | Run G | Run H |
| Calcination Temperature, ° C. | 800 | 1300 | 1400 |
| Yield of Calcined Coke, % by weight | 92.4 | 90.8 | 90.3 |
| Apparent Density, g/cm$^3$ | 1.20 | 1.42 | 1.30 |
| Thermal Expansion Coefficient of Shaped Article 10$^{-6}$/° C. | | | |
| Baked at 1000° C. | 1.2 | 1.5 | 1.6 |
| Graphitized at 2600° C. | 0.8 | 1.0 | 1.0 |

Experiment No. 4 (Run I)

High quality green coke prepared according to the ordinary delayed coking process by using as a feed oil a mixture of 50% of vacuum residuum prepared from Sumatrun crude oil and 50% of a catalytically craked residuum was calcinated in the same manner as in Run C. Properties of the resulting coke are shown in Table 4.

Table 4

| Relation between Calcination Temperature and Quality of Calcined Coke | |
|---|---|
| | Run I |
| Calcination Temperature, ° C. | 1300 |
| Yield of Calcined Coke, % by weight | 92.0 |
| True Specific Gravity, g/cm$^3$ | 2.112 |
| Apparent Density, g/cm$^3$ | 1.38 |
| Thermal Expansion Coefficient of Shaped Article, 10$^{-6}$/° C. | |
| Baked at 1000° C. | 1.5 |
| Graphitized at 2600° C. | 0.8 |

From the results shown in Tables 1 and 3, it will readily be understood that when the calcination temperature is low, a product having a very low thermal expansion coefficient but a low apparent density can be obtained. In other words, from these experimental results, we found that calcined coke having a satisfactory thermal expansion coefficient can be obtained when the calcination temperature is low. However, in this product, the apparent density is not satisfactory, because it is too low. The high quality green coke used in Experiment No. 3 which were prepared according to the teachings of Japanese Patent Application No. 144687/73 and the high quality green coke used in Experiment No. 4 which was prepared in a method which is similar to U.S. Pat. No. 2,775,549 provide a calcined product satisfactory in both the apparent density and thermal expansion coefficient, namely a product having a high apparent density and a low thermal expansion coefficient (see Runs G and I), by the customary one-staged calcination. This is, however, due to improvements in the coking step, as pointed out hereinbefore.

(B) Preparation of Coke by Two-Staged Calcination

As indicated hereinbefore, when calcination is carried out at a low temperature, the thermal expansion coefficient can be lowered in the calcined coke product. In view of this fact, various green cokes were calcined at about 800° C. the temperature capable of providing the lowest thermal expansion coefficient, and they were again calcined at a higher temperature (the customarily adopted calcination temperature). Then, changes in the apparent density and thermal expansion coefficient in the calcined products were examined.

Experiment No. 5

The same green coke as used in Experiment No. 2, i.e., green coke having a volatile matter content of 8.9%, which was prepared by using as the feed oil a vacuum residuum obtained from Sumatran crude oil and employing a delayed coker of the ordinary type was pulverized to obtain starting green coke having a size of 3 to 3.5 mesh. Then, about 500 g of the starting coke was charged in a graphite crucible and heated in a muffle furnace to 800° C. at a rate of 200° C. per hour, and this elevated temperature was maintained for 1 hour. Then, the temperature was elevated again at a rate of 200° C. per hour to 1300° C. and this temperature was maintained for 1 hour. Then, the calcined product was naturally cooled to room temperature. The so obtained calcined coke had an apparent density of 1.34 g/cm$^3$, and the thermal expansion coefficient of the calcined coke was $1.7 \times 10^{-6}$/° C. as measured with respect to a shaped article baked at 1000° C. and $1.2 \times 10^{-6}$/° C. as measured with respect to a shaped article graphitized at 2600° C.

Experiment No. 6

The same high quality green coke as used in Experiment No. 4 was heated to 800° C. at a rate of 200° C. per hour and maintained at this temperature for 1 hour. Immediately, without cooling, the temperature was elevated again at a rate of 200° C. per hour to 1300° C. and this elevated temperature was maintained for 1 hour. The resulting calcined coke had an apparent density of 1.39 g/cm$^3$, and the thermal expansion coefficient was $1.5 \times 10^{-6}$/° C. as measured with respect to a shaped article baked at 1000° C. and $0.8 \times 10^{-6}$/° C. as measured with respect to a shaped article graphitized at 2600° C.

As is seen from the results obtained in Experiments Nos. 5 and 6, when the calcination is conducted stepwise in two stages, a product having an improved apparent density over the products obtained in Experiments Nos. 1, 2, 3 and 4 can be obtained, but the thermal expansion characteristics cannot be improved. Namely, when green coke prepared according to the ordinary delayed coking process is employed, a calcined coke having improved properties for production of graphite electrodes cannot be obtained by the one-staged or stepwise two-staged calcination.

(C) Preparation of Coke by Two-staged Calcination Including Intermediate Cooling Step (the process of the present invention)

To our great surprise, it was found that if an intermediate cooling step is provided in the above-mentioned stepwise two-staged calcination, calcined coke having fully improved apparent density and thermal expansion characteristics for production of graphite electrodes, namely calcined coke having a high apparent density and a low thermal expansion coefficient, can be obtained.

Based on this finding, we have now completed a two-staged calcination process of the present invention comprising subjecting green coke prepared according to the ordinary delayed coking process to the first stage calcination at a temperature lower than the customarily adopted calcination temperature (for example, about 600° to about 900° C.), once cooling the calcined coke to a temperature sufficiently lower than the first stage calcination temperature (for example, about 100° C. or lower), and again calcining the coke at a temperature within the customarily adopted calcination temperature range (about 1200° to about 1500° C.).

The present invention will now be described by reference to the following Examples that by no means limit the scope of the invention.

EXAMPLE 1

(Runs J, K, L, M and N)

The same green coke as used in Experiment No. 2, which had a volatile matter content of 8.9% by weight, was pulverized to obtain starting green coke having a size of 3 to 3.5 mesh, and 500 g each of this pulverized green coke was charged in 5 graphite crucibles. In a muffle electric furnace, the temperature was elevated to a prescribed level, namely 600° C. (Run J), 700° C. (Run K), 800° C. (Run L), 900° C. (Run M) or 1000° C. (Run N), at a rate of 200° C. per hour, and this elevated temperature was maintained for 1 hour. Then, the coke was once cooled to about 100° C. by turning off the switch of the muffle electric furnace, and the temperature was elevated again to 1300° C. at a rate of 200° C. per hour and this elevated temperature was maintained for 1 hour. Then, the coke was naturally cooled to room temperature to obtain calcined coke. With respect to each of the so obtained products, the yield, true specific gravity, apparent density and thermal expansion coefficient were measured to obtain the results shown in Table 5.

Table 5

Relation between Quality of Calcined Coke Obtained by Two-Staged Calcination Process Including Intermediate Cooling Step and First Stage Calcination Temperature

|  | Run J | Run K | Run L | Run M | Run N |
|---|---|---|---|---|---|
| First Stage Calcination Temperature, ° C. | 600 | 700 | 800 | 900 | 1000 |
| Yield of Calcined Coke, % by weight | 90.4 | 90.5 | 90.6 | 90.5 | 89.6 |
| True Specific Gravity, g/cm$^3$ | 2.100 | 2.108 | 2.110 | 2.106 | 2.107 |
| Apparent Density, g/cm$^3$ | 1.35 | 1.35 | 1.42 | 1.35 | 1.34 |
| Thermal Expansion Coefficient of Shaped Article, $10^{-6}$/° C. |  |  |  |  |  |
| Baked at 1000° C. | 1.5 | 1.4 | 1.2 | 1.6 | 1.7 |
| Graphitized at 2600° C. | 1.0 | — | 0.8 | — | 1.1 |

These experimental results clearly indicate that when green coke is calcined according to the two-staged calcination process of the present invention including the intermediate cooling step, especially if the first stage calcination is carried out at about 600° to about 900° C., improved coke having a high apparent density and low thermal expansion characteristic especially suitable for production of high power electrodes can be obtained.

When the first stage calcination is carried out at a temperature lower than 600° C., since this temperature is not greatly different from the coking temperature (about 490° C.), volatile matters are hardly removed, and hence, it can be inferred that the obtained results will be substantially the same as those obtained by the conventional one-staged calcination process. When the first stage calcination temperature is higher than 1000° C., as can be presumed from the results of Run N, no substantial improvement can be obtained by the two-staged calcination.

Accordingly, in the process of the present invention, it is preferred that the first stage calcination can be carried out at about 600° to about 900° C.

In order to examine the effects of the temperature-elevating rate at each calcination stage, the retention time at each calcination stage and the cooling rate at the intermediate cooling step on the apparent density and thermal expansion characteristics of calcined coke, the following experiments were conducted. In these experiments, the first stage calcination was conducted at 800° C. and the second calcination was conducted at 1300° C., as in Run L of Example 1. Details of these experiments will now be described.

EXAMPLE 2

Run O

The same green coke as used in Experiment No. 2 which had a volatile matter content of 8.9% by weight was pulverized to obtain starting green coke having a size of 3 to 3.5 mesh, and about 500 g of the starting green coke was charged in a graphite crucible and the crucible was placed in a muffle electric furnace. The temperature was elevated to 800° C. at a rate of 200° C. per hour, and immediately thereafter, the crucible was taken out of the furnace and immersed in water to cool the coke rapidly to room temperature.

Then, at the second stage calcination step, the coke-charged graphite crucible was placed in a muffle electric furnace in which the inside temperature was controlled to about 1300° C. in advance, and immediately when the coke temperature arrived at 1300° C., the crucible was taken out of the muffle furnace. When the coke temperature had lowered to about 1000° C., the coke was rapidly cooled to room temperature in water in the same manner as described above.

In this run, the time required for cooling after the first staged calcination step was about 30 minutes. The temperature-elevating rate at the second stage calcination step was about 1300° C. per hour, and the time required for cooling was about 50 minutes.

Obtained results are shown in Table 6.

Run P

About 500 g of the same starting green coke as prepared in Run O was charged in a graphite crucible and the crucible was placed in a muffle electric furnace. The temperature was elevated to 800° C. at a rate of about 300° C. per hour, and the elevated temperature was maintained for 1 hour. Then, the coke was once cooled to 100° C. by turning off the switch of the muffle electric furnace, and the temperature was elevated again to 1300° C. at a rate of 200° C. per hour and the elevated temperature was maintained for 1 hour. Then coke was naturally cooled to room temperature to obtain calcined coke.

Obtained results are shown in Table 6.

Run Q

About 500 g of the same starting green coke as prepared in Run O was charged in a graphite crucible and the crucible was placed in a muffle electric furnace. The temperature was elevated to 800° C. at a rate of about 400° C. per hour, and immediately thereafter, the crucible was taken out of the muffle furnace and the coke was rapidly cooled to room temperature in the same manner as in Run O. Then, the second stage calcination was carried out in the same manner as in Run O to obtain calcined coke.

Obtained results are shown in Table 6.

Run R

About 500 g of the same starting green coke as prepared in Run O was charged in a graphite crucible and the crucible was placed in a muffle furnace in which the temperature was controlled to 800° C. in advance. Immediately when the coke temperature arrived at 800° C., the crucible was taken out of the muffle furnace and the coke was rapidly cooled to room temperature in water in the same manner as in Run O.

The second stage calcination was carried out in the same manner as in Run O to obtain calcined coke. In this run, the temperature-elevating rate at the first calcination step was 800° C. per hour.

Obtained results are shown in Table 6.

Runs S, T, and U

About 500 g each of the same starting green coke as prepared in Run O was charged in 3 graphite crucibles. In a muffle electric furnace, the temperature was elevated to 800° C. at a rate of 200° C. per hour, and this elevated temperature was maintained for 1 hour. Then the coke was once cooled to a prescribed level, namely 200° C. (Run S), 300° C. (Run T), or 400° C. (Run U) by turning off the switch of the muffle electric furnace, and the temperature was elevated again to 1300° C. at a rate of 200° C. per hour and this elevated temperature was maintained for 1 hour. Then, the coke was naturally cooled to room temperature to obtain calcined coke.

Obtained results are shown in Table 6.

Table 6

| | Run O | Run P | Run Q | Run R | Run S | Run T | Run U |
|---|---|---|---|---|---|---|---|
| Temperature-Elevating Rate at First Stage Calcination, ° C./hour | 200 | 300 | 400 | 800 | 200 | 200 | 200 |
| Retention Time at First Stage Calcination (800° C.) hour | 0 | 1 | 0 | 0 | 1 | 1 | 1 |
| Temperature-Elevation Rate at Second Stage Calcination, ° C./hour | 1300 | 200 | 1300 | 1300 | 200 | 200 | 200 |
| Retention Time at Second Stage Calcination (1300° C.), hour | 0 | 1 | 0 | 0 | 1 | 1 | 1 |
| Intermediate Cooling Temperature ° C. | room temperature | 100 | room temperature | room temperature | 200 | 300 | 400 |
| Apparent Density, g/cm$^3$ | 1.35 | 1.35 | 1.35 | 1.33 | 1.33 | 1.33 | 1.33 |
| Thermal Expansion Coefficient of Shaped Article, $10^{-6}$/° C. | | | | | | | |
| Baked at 1000° C. | 1.5 | 1.5 | 1.5 | 1.5 | 1.6 | 1.7 | 1.7 |
| Graphitized at 2600° C. | 1.0 | 1.0 | 1.0 | 1.0 | 1.0 | 1.1 | 1.1 |

From the foregoing results, it is seen that there was no variation in thermal expansion characteristics among these Runs except for Runs S, T and U in each of which the coke was cooled to 200° C. or more at the intermediate cooling step. This means that the thermal expansion characteristics of calcined coke are hardly influenced by temperature-elevating rates at respective calcination stages, retention times at respective calcination stages and cooling rates at the intermediate cooling step and after the second stage calcination step, and that when the intermediate cooling is insufficient, for example, the cooling temperature is higher than about 100° C., the desired effects cannot be attained.

It is also found that the apparent density is slightly lowered with higher temperature-elevating rate at the first stage calcination step.

In conclusion, from the foregoing experimental results, it will readily be understood that according to the present invention, coke having improved thermal expansion characteristics and apparent density for production of graphite electrodes, namely a low thermal expansion coefficient (lower than $1.5 \times 10^{-6}$/° C. with respect to a shaped article baked at 1000° C. and lower than $1.0 \times 10^{-6}$/° C. with respect to a shaped article graphitized at 2600° C.) and a high apparent density (at least 1.35 g/cm$^3$), can be prepared from green coke obtained according to the ordinary delayed coking process, by conducting the first stage calcination at about 600° to about 900° C., preferably about 800° C., preferably while adopting a temperature-elevating rate of about 200° to 300° C. per hour, preferably about 200° C. per hour, conducting the intermediate cooling at a temperature sufficiently lower than the first stage calcination temperature, such as about 100° C. or lower and performing the second stage calcination at about 1200° to about 1500° C., preferably about 1300° to about 1400° C.

Further, in order to obtain more homogeneous, calcined coke products, it is recommended that green coke be maintained at the above-mentioned first stage calcination temperature for about 0.5 to about 1 hour and that at the second stage calcination step the temperature be elevated at a rate of about 200° C per hour or higher and the coke be maintained at the second stage calcination temperature for about 0.5 to about 1 hour. However, as pointed out hereinbefore, these parameters have no substantial influence on the apparent density and thermal expansion characteristics, and hence, they are not particularly critical in the present invention. Similarly, the rate of cooling to be conducted after the second stage calcination has no substantial influence on the apparent density and thermal expansion characteristics. However, if calcined coke is cooled too rapidly, the coke is contracted or its structure is destroyed to form very fine particles. Accordingly, it is preferred that the coke be cooled from the calcination temperature to room temperature over a period of about 0.5 hour.

The reason why the desired effects can be attained in the process of the present invention has not been theoretically elucidated, but it is believed that when green coke is preliminarily calcined at a temperature of 600° to 900° C., the volatile matters contained in the green coke are violently evaporated, and, by this violent evaporation of the volatile matters, the green coke is rendered very porous and thereby the arrangement of the hexagonal net layer planes in the coke is disturbed. That is, we believe that the reason is in that the green coke rendered porous by the calcination conducted at the above temperature is then shrunk by the cooling step following said calcination, and by elevating the temperature again and recalcinating, the internal stress left in the shrunk coke is removed by expansion during the reheating, whereby the arrangement of hexagonal net layer planes will readily be restored.

Further, calcined coke which has passed through the second stage calcination conducted at about 1200° to about 1500° C. according to the present invention can easily be pulverized to a size optimum for filler coke for production of electrodes. As a result, operations such as mixing with binder pitch and molding can be remarkably facilitated.

Any of green cokes that are prepared from ordinary petroleum materials according to the known delayed coking process can be used in the process of the present invention. In addition, green cokes prepared from ordinary coal type starting oils according to the known delayed coking process can similarly be used in the process of the present invention.

Of course, the process of the present invention can be applied to the calcination of good quality green coke prepared by the specific improved delayed coking process such as mentioned hereinbefore, to obtain high quality calcined coke having more excellent properties than calcined coke obtained when such good quality green coke is calcined according to the conventional processes. Still further, to our great surprise, although the prior calcination process cannot produce high quality calcined coke at all from green coke from a straight run residuum, according to the process of the present invention, even from green coke from such straight run residuum, there can be obtained high quality coke superior or comparable to the conventionally calcined cokes prepared from the above-mentioned good quality green coke.

Another example showing the process of the present invention will now be described.

EXAMPLE 3

High quality green coke prepared from a mixture of 50% of a vacuum residuum obtained from Sumatran crude oil and 50% of a catalytically cracked residuum (the same green coke as used in Experiment No. 4) was treated in the same manner as in Run L of Example 1 to obtain calcined coke. Properties of the so obtained calcined coke were measured to obtain results shown in Table 7.

Table 7

| | |
|---|---|
| Yield of Calcine Coke, % by weight | 91.4 |
| True Specific Gravity, g/cm$^3$ | 2.110 |
| Apparent Density, g/cm$^3$ | 1.41 |
| Thermal Expansion Coefficient of Shaped Article, $10^{-6}$/° C. | |
| Baked at 1000° C. | 1.1 |
| Graphitized at 2600° C. | 0.7 |
| True Specific Gravity of Coke graphitized at 2600° C., g/cm$^3$ | 2.169 |

The foregoing results indicated that the product obtained in this Example is clearly improved over products obtained according to the conventional process using good quality green coke (Experiment No. 4) with respect to both the thermal expansion characteristics and apparent density. In short, it is seen that even when good quality green coke is used in the process of the present invention, can be attained effectively.

What we claim is:

1. A three-step process for the preparation of high quality coke which comprises calcining a green coke obtained according to the delayed coking process in a first step at a temperature of about 600° to about 900° C., then cooling the coke in a second step to about 100° C. or lower and thereafter calcining the coke in a third step at a temperature of about 1200° to about 1500° C.

2. A process for the preparation of high quality coke according to claim 1 wherein the first stage calcination is carried out at about 800° C.

3. A process for the preparation of high quality coke according to claim 1 wherein the first stage calcination temperature is attained by elevating the temperature at a rate of about 200° to about 300° C. per hour.

4. A process for the preparation of high quality coke according to claim 1 wherein the coke is maintained at the first stage calcination temperature for about 0.5 to about 1 hour and at the second stage calcination temperature for about 0.5 to about 1 hour.

5. A process for the preparation of high quality coke according to claim 1 wherein the green coke is one obtained from an ordinary petroleum type raw material according to the delayed coking process.

6. A process for the preparation of high quality coke according to claim 1 wherein the green coke is one prepared from an ordinary coal type starting oil according to the delayed coking process.

* * * * *